Feb. 5, 1952 — D. W. KELBEL — 2,584,469
TRANSMISSION
Filed Dec. 22, 1947
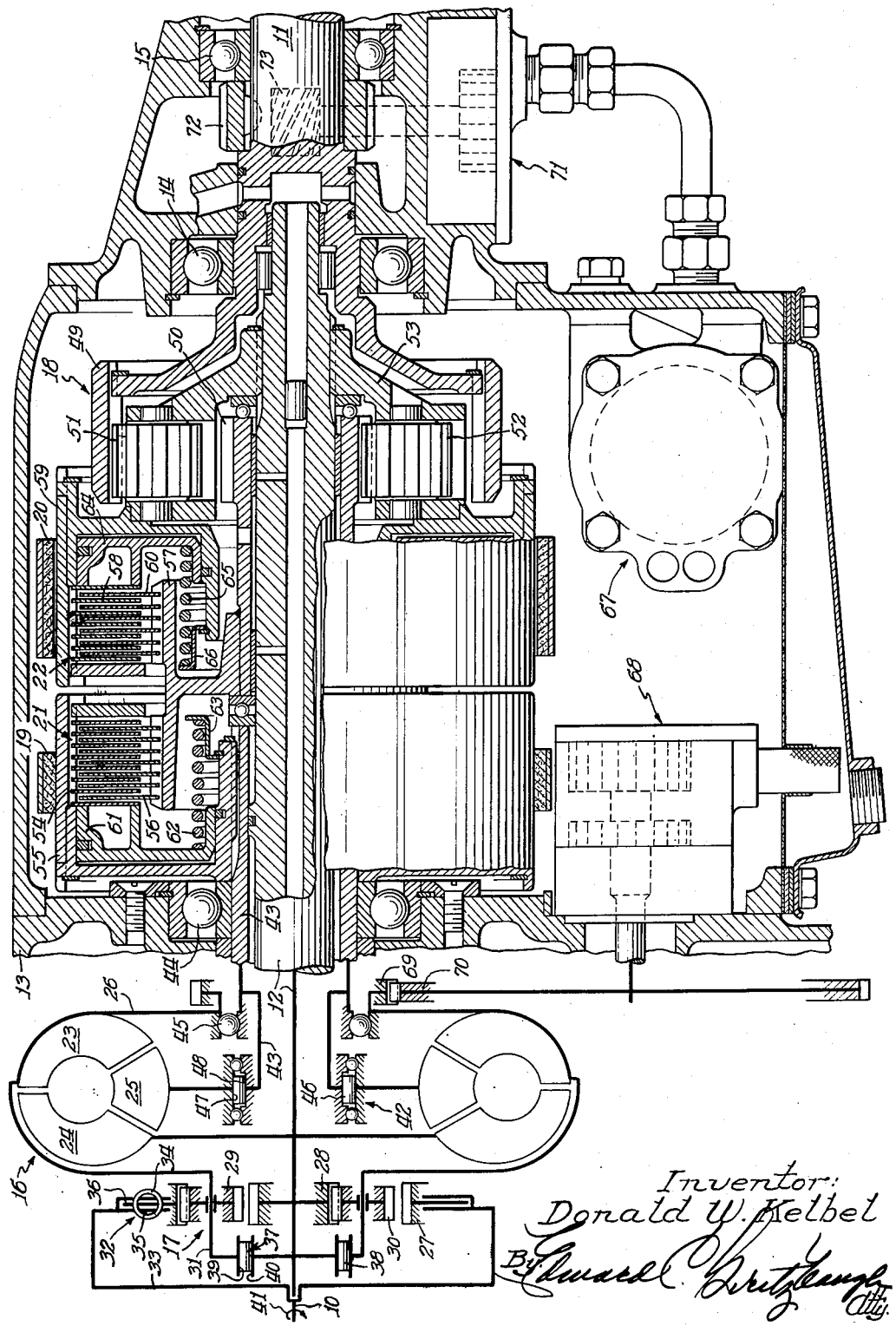
Inventor:
Donald W. Kelbel Patented Feb. 5, 1952

2,584,469

UNITED STATES PATENT OFFICE 2,584,469

TRANSMISSION

Donald W. Kelbel, Muncie, Ind., assignor to Borg-Warner Corporation, Chicago, Ill., a corporation of Illinois Application December 22, 1947, Serial No. 793,261

2 Claims. (Cl. 74—732)

My invention relates to transmissions specifically for automobiles, and more particularly to automotive transmissions comprising hydrodynamic torque transmitting devices.

It is an object of my invention to provide an improved transmission of this type which includes a friction coupling which is so arranged with the parts of the transmission that it may be utilized for completing the drive both in forward and in reverse.

It is another object of the invention to provide a transmission comprising a hydrodynamic coupling device and which may be shifted from a low speed forward drive to a high speed forward drive by the disengagement of one friction coupling and the engagement of another. More particularly, it is an object to provide such a transmission which comprises a hydraulic torque converter, a friction brake for the reaction element of the torque converter, a coupling for connecting a reaction member of a gear set with the reaction element whereby both may be braked, and a second coupling for use instead of the last-named coupling for locking up the gear set to provide a direct drive.

The invention consists of the novel constructions, arrangements and devices to be hereinafter described and claimed for carrying out the above-stated objects and such other objects as will appear from the following detailed description of a certain preferred embodiment illustrated in the accompanying drawing in which the figure shows a longitudinal sectional view of a transmission embodying the principles of the invention with certain portions of the transmission being shown diagrammatically.

Referring now to the drawing, the illustrated transmission comprises a driving shaft 10 adapted to be connected to an engine (not shown) of a vehicle in which the transmission is installed, a driven shaft 11 adapted to be connected with the driving wheels (not shown) of the vehicle, and an intermediate shaft 12. The shaft 12 is piloted in both the shafts 10 and 11 as shown, and the shaft 11 is rotatably disposed within the transmission casing 13 by means of bearings 14 and 15.

The transmission comprises in general a hydrodynamic torque converter 16, a planetary speed-up gear 17 between the drive shaft 10 and torque converter, a planetary gear set 18, a friction band brake 20 for an element of the gear set 18, a multiple disc friction clutch 21 which is a starting clutch as will be hereinafter described and a multiple disc friction direct drive clutch 22.

The torque converter 16 is of a well known type and comprises a bladed impeller 23, a bladed runner or driven element 24 and a bladed stator or reaction element 25. The impeller 23 comprises a housing 26 which forms the principal part of the housing for the torque converter, and this housing contains a fluid, such as oil, by means of which the runner 24 is driven by the impeller 23. The runner 24 is splined to the intermediate shaft 12 and the impeller 23 is connected to be driven by the planetary gear set 17 as will now be described.

The planetary gear set 17 comprises a ring gear 27, a sun gear 28, a set of planet gears 29 in mesh with the ring gear and a second set of planet gears 30 in mesh with the sun gear and with the planet gears 29. The planet gears 29 and 30 are rotatably disposed on a planet gear carrier 31 which is fixed with respect to the impeller housing 26 as shown. The sun gear 28 is splined on the shaft 12 as shown. The ring gear 27 is connected with the drive shaft 10 through a vibration dampener 32 which in turn is fixed to a flywheel 33 carried by the drive shaft 10. The vibration dampener 32 may be of any suitable construction and may comprise springs 34 disposed between opposite parts 35 and 36 of the dampener.

A one-way clutch 37 is provided between the planet gear carrier 31 and the intermediate shaft 12 and comprises rollers 38 disposed between opposite cam surfaces 39 and 40. The roller clutch is so constructed as to overrun and transmit no drive when the drive shaft 10 is rotating in the forward direction as is indicated by the arrow 41 and the intermediate shaft 12 is rotating in the same direction at the same or a less speed; however, the roller clutch 37 will engage if the intermediate shaft 12 is rotated in the direction as indicated by the arrow 41 and the shaft 10 is not being driven by the engine of the vehicle.

The stator 25 is mounted by a combination bearing and roller clutch 42 on a tubular shaft 43 disposed on the intermediate shaft 12 and which is rotatably mounted within the transmission casing 13 by means of a bearing 44 and within the impeller 26 by means of a bearing 45. The assembly 42 comprises rollers 46 disposed between facing cam surfaces 47 and 48 and the arrangement of the cams is such that when the shaft 43 is held stationary, the roller clutch will engage to prevent the stator 25 from rotating in the reverse direction, that is in the direction opposite to that indicated by the arrow 41.

The assembly of the hydrodynamic torque converter 16 and the planetary speed-up gear set 17 is very similar to the assembly of the same parts shown in a patent to Schneider, No. 2,333,681, and hence will not be further described in detail. In brief, the assembly operates such that the impeller 23 is rotated at a higher speed than the shaft 10 when the transmission is driven initially with the intermediate shaft 12, which constitutes the driven shaft for the converter 16, stationary, due to the operation of the gear set 17. Torque is thus transmitted to the runner 24 and the shaft 12, and when these parts begin to rotate and increase in speed, the speeds of the impeller 23 and the shaft 10 become more nearly equal. The stator 25 functions to change the direction of flow of fluid within the torque converter and provides a torque on the runner 24 which is greater than that impressed on the impeller 23, and this condition obtains until the runner 24 rotates at a substantial speed whereupon the stator 25 begins to rotate in the forward direction and the converter functions from this time forward as a simple fluid coupling in which there is no increase in torque between the driving and driven elements.

The planetary gear set 18 comprises a ring gear 49, a sun gear 50, a set of planet gears 51 in mesh with the ring gear and a set of planet gears 52 in mesh with the sun gear and with the planet gears 51. The planet gears 51 and 52 are mounted on a carrier 53 which is splined to the intermediate shaft 12. The ring gear 49 is connected with the driven shaft 11, as shown.

The sun gear 50 is connected with both of the multiple plate friction clutches 21 and 22. The clutch 21 comprises clutch plates 54 splined to a drum 55 and clutch plates 56 splined to a drum 57. The drum 57 is connected with the sun gear 50 and the drum 55 is connected with the shaft 43. The multiple plate friction clutch 22 comprises friction plates 58 splined to a drum 59 and friction plates 60 splined to the drum 57. The drum 59 is connected with the carrier 53 for the planet gears 51 and 52 as shown.

A fluid pressure actuated piston 61 is provided for engaging the friction clutch 21, being slidably disposed in a suitable cavity provided within the drum 55. A return spring 62 is provided between the piston 61 and an annular collar 63 fixed with respect to the drum 55. A piston 64, a spring 65 and an annular spring retainer 66 similar to the corresponding parts for the piston 61 are provided for actuating the friction clutch 22. Suitable fluid passages (not shown) within the concentric shafts in the transmission may be provided for supplying fluid to the pistons 61 and 64.

The friction brakes 19 and 20 are of the ordinary friction band type and may be actuated by suitable hydraulic motors, such as the motor 67 provided for the brake 20.

A fluid pressure pump 68 for supplying fluid under pressure for actuating the friction brakes and clutches is provided, and this pump is driven from the impeller 23 through gears 69 and 70. A fluid pump 71 also for supplying fluid under pressure may be provided and this may be driven by a gear 72 on the driven shaft 11 and a gear 73.

In operation, the transmission drive shaft 10 is driven from the engine (not shown) of the vehicle in which the transmission is installed and the driven shaft 11 is connected with the driving wheels (not shown) of the vehicle. The drive shaft 10 is kept in rotation by the engine and the intermediate shaft 12 is driven from the torque converter 16 and the planetary gear set 17 from the drive shaft 10.

The transmission provides a neutral condition, low and direct drives forward and a reverse drive. In the neutral condition the friction clutches 21 and 22 and the friction brakes 19 and 20 are disengaged. Since the friction brake 19 is disengaged, the stator 25 is free to rotate as it will and since the two clutches 21 and 22 and the brake 20 are disengaged, none of the members of the planetary gear set 18 functions as a reaction member and the drive between the shafts 12 and 11 through the gear set is broken.

For low speed forward drive the brake 19 is engaged and the clutch 21 is engaged. Engagement of the brake 19 stops the shaft 43 and thereby the stator 25 from rotation and torque is thus impressed upon the intermediate shaft 12 from the runner 24. The sun gear 50 constitutes the reaction member of the planetary gear set 18; however, this element is not braked until the friction clutch 21 is engaged. Upon engagement of this friction clutch a power train is completed through the gear set 138 between the shafts 12 and 11, driving the shaft 11 at a lower speed than the shaft 12, and this is the low speed forward drive of the transmission. Either the brake 19 or the clutch 21 may be engaged as gradually as desired after the other has previously been engaged in order to complete this power train in a gradual manner for starting the vehicle as will be apparent.

The transmission may be shifted from low speed forward drive to direct drive by disengaging the friction clutch 21 and engaging the clutch 22. Engagement of the clutch 22 has the effect of locking together for unitary rotation the planet gear carrier 53 and the sun gear 50 so that the planet gear set 18 is locked up and the driven shaft 11 is driven at the same speed and in a one-to-one ratio from the intermediate shaft 12. With the clutch 22 engaged the transmission is thus in direct drive. The brake 19 is kept in engagement so that the reaction element 25 of the hydrodynamic torque converter is available for torque multiplication, assuming that the torque required to be transmitted is sufficient for such multiplication, as is in accordance with the well known principles of operation of such hydrodynamic devices.

Reverse drive is obtained by engaging the brake 20 and the friction clutch 21. Engagement of the friction clutch 21 has the effect of coupling together the shaft 43 and the sun gear 50 and engagement of the brake 20 has the effect of braking the runner 24 which is coupled to the carrier 53 through the shaft 12. With the runner 24 of the hydrodynamic device 16 being held stationary by means of the brake 20, the reaction member 25 is driven in the reverse direction, and this rotation is transmitted through the one-way clutch 42, the shaft 43, the drum 55, the clutch 21, and the drum 57 to the sun gear 50, and the ring gear 49 and thereby the shaft 11 are driven in the reverse direction at a speed less than the speed of the shaft 43, the reduction in speed being brought about by the planetary gear set 18. Since both the clutch 21 and the brake 20 are necessary for a start in reverse drive, this drive may be completed as gradually as desired by gradual engagement of either one of these two control parts.

My improved transmission advantageously provides an absolute neutral in which no torque is transmitted from the drive shaft to the driven shaft so that the vehicle in which the transmission is installed does not have a tendency to creep. The brake band 19 may be applied to condition the transmission for forward drive; however, due to the clutch 21 which may be held open until the accelerator of the vehicle is depressed, there is no braking action on the sun gear 50 and no torque is transmitted from the intermediate shaft 12 to the driven shaft 11. The same holds for reverse drive—even though the reverse brake 20 is engaged; nevertheless, no torque is transmitted between the shafts 12 and 11 until engagement of the clutch 21.

I wish it to be understood that my invention is not limited to the specific constructions, arrangements, and devices shown and described except only insofar as the appended claims may be so limited as it will be apparent to those skilled in the art that changes may be made without departing from the principles of the invention.

I claim:

1. In a transmission, the combination of a drive shaft, a driven shaft, a hydraulic torque converter comprising an impeller, a rotor, and a stator, said impeller being connected to be driven by said drive shaft, a planetary gear set, said gear set comprising a sun gear element, a ring gear element, a planet gear in mesh with said ring gear element, a planet gear in mesh with said first-named planet gear and with said sun gear element, and a carrier element for said planet gears, one of said elements being connected with said driven shaft and another of said elements being connected with said rotor, a friction brake for said stator, and a friction coupling for connecting the remaining one of said three elements with said stator whereby to be braked by said friction brake, said friction brake comprising a brake drum and a band surrounding the drum and adapted to engage it, said friction coupling comprising a plurality of interleaved plates disposed within said drum, and a friction clutch for connecting together two of said elements of said planetary gear set for locking up said elements for unity of rotation and comprising a plurality of interleaved plates disposed within a drum located adjacent said first-named drum and coaxially therewith.

2. In a transmission, the combination of a drive shaft, a driven shaft, a hydraulic torque converter having an impeller, a rotor, and a stator, said impeller being connected to be driven by said drive shaft, a friction brake for said stator, a planetary gear set comprising a sun gear, a ring gear, a planet gear in mesh with said ring gear, a second planet gear in mesh with said first-named planet gear and with said sun gear, and a carrier for said planet gears, said ring gear being connected with said driven shaft and said carrier being connected with said rotor, a friction coupling for connecting said sun gear with said stator whereby both the sun gear and the stator may be braked for a low speed forward drive from said rotor to said driven shaft, a friction brake for said carrier and said rotor for reverse drive, and a friction clutch for connecting together two elements of said planetary gear set for a direct drive from said rotor to said driven shaft, said friction brakes comprising a pair of coaxial drums disposed adjacent each other and a friction band adapted to engage each of the drums, said friction coupling comprising a plurality of interleaved friction plates disposed in the drum for said stator brake and said friction clutch comprising a plurality of interleaved friction plates disposed within the other of said drums.

DONALD W. KELBEL.

REFERENCES CITED

The following references are of record in the file of this patent:

UNITED STATES PATENTS

| Number | Name | Date |
|---|---|---|
| 2,088,782 | Ford | Aug. 3, 1937 |
| 2,293,358 | Pollard | Aug. 18, 1942 |
| 2,308,547 | Schneider | Jan. 19, 1943 |
| 2,351,213 | James | June 13, 1944 |
| 2,374,303 | Osborne | Apr. 24, 1945 |
| 2,414,359 | Carnagua | Jan. 14, 1947 |

FOREIGN PATENTS

| Number | Country | Date |
|---|---|---|
| 614,340 | France | Dec. 11, 1926 |